METHOD OF PRODUCING OPTICAL WAVEGUIDE FIBERS
Filed May 11, 1970
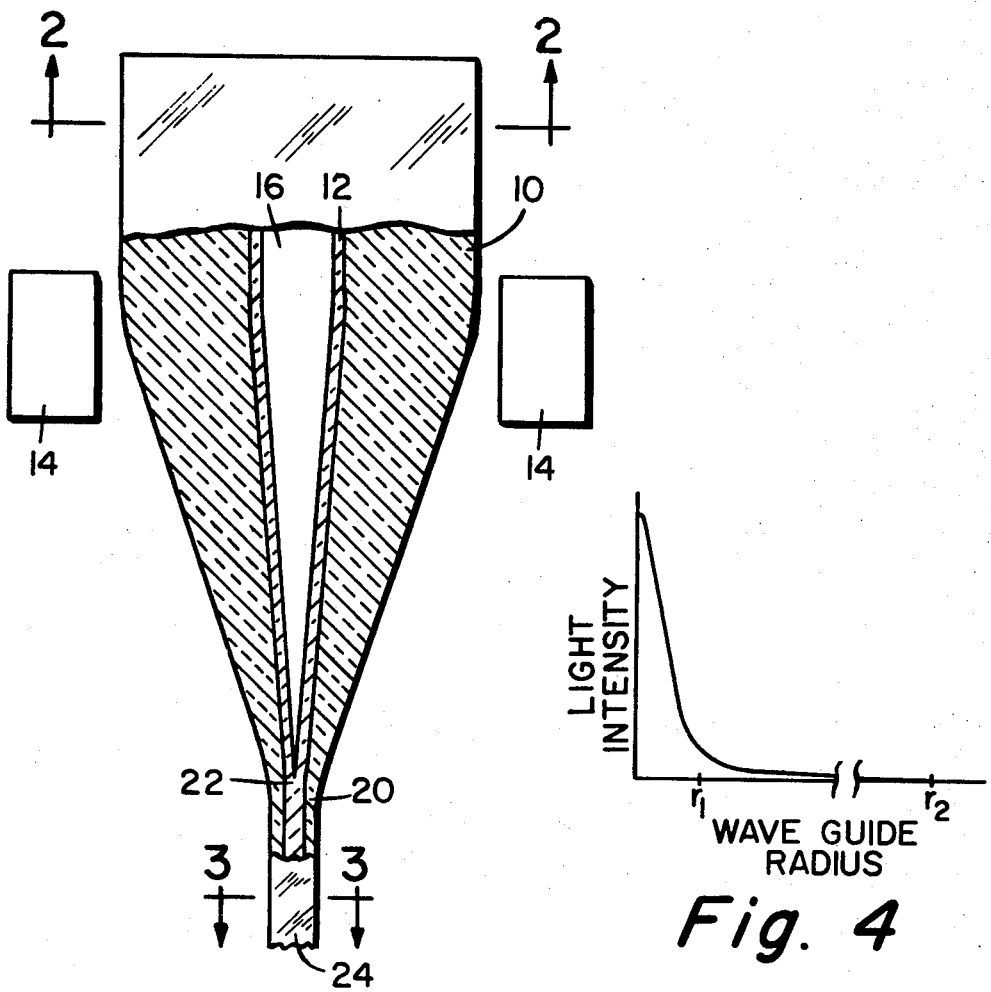
Fig. 1
Fig. 4
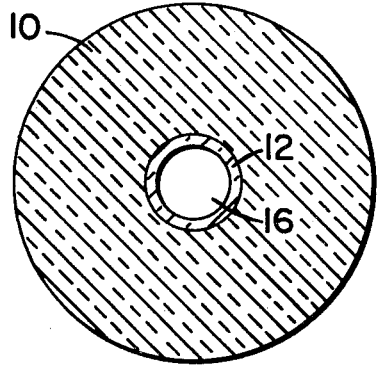
Fig. 2
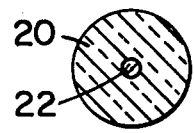
Fig. 3
INVENTORS.
Donald B. Keck
Peter C. Schultz
BY Walter S. Zebrowski
ATTORNEY

United States Patent Office 3,711,262
Patented Jan. 16, 1973

3,711,262
METHOD OF PRODUCING OPTICAL
WAVEGUIDE FIBERS
Donald B. Keck, Corning, and Peter C. Schultz, Painted
Post, N.Y., assignors to Corning Glass Works, Corning, N.Y.
Filed May 11, 1970, Ser. No. 36,267
Int. Cl. C03c 25/02; C03b 21/00
U.S. Cl. 65—3          28 Claims

ABSTRACT OF THE DISCLOSURE

A method of producing an optical waveguide by first forming a film of glass with a preselected index of refraction on the inside wall of a glass tube having a different preselected index of refraction. This glass tube and glass film combination is then drawn to reduce the cross-sectional area and to collapse the film of glass to form a fiber having a solid cross-sectional area; the core being formed from the glass film, and the cladding being formed from the glass tube.

BACKGROUND OF THE INVENTION

(I) Field of the invention

The increase in the amount of traffic that communication systems are required to handle has forced the development of high capacity systems. The presently used systems which operate between $10^6$ Hz. and $10^9$ Hz., although relatively new, have already become saturated in some frequency bands by excessive traffic. To allow for needed increases in traffic which the present systems cannot accommodate, commercial communication groups are presently installing high capacity systems that operate between $10^9$ Hz. and $10^{12}$ Hz. Even with the increased capacity that these new systems will offer, traffic growth is so rapid that saturation of these systems is anticipated in the very near future. Therefore, to accommodate even more traffic, higher capacity communication systems operating around $10^{15}$ Hz. are needed. These future systems will hereinafter be referred to as "optical communication systems" since $10^{15}$ Hz. is within the frequency spectrum of light. Waveguides are desirable for effective transmission of information by systems operating at frequencies above $10^9$ Hz. Systems operating at frequencies between $10^9$ Hz. and $10^{12}$ Hz. normally use electrically conductive waveguides as their transmitting medium. Waveguides used by optical communication systems operating around $10^{15}$ Hz. are herein referred to as "optical waveguides" and are normally constructed from a transparent dielectric material such as glass or plastic. Producing a satisfactory optical waveguide has been one of the more difficult problems in the development of an effective optical communication system.

It is well known to one skilled in the art that light can be forced to propagate along a transparent fiber structure which has a higher refractive index than its surroundings. The ordinary use of such optical fibers is to transmit light or an image from one point to another. Optical fibers produced for these purposes must avoid excessive attenuation of the transmitted light to be effective. However, to be an effective transmitting media for an optical communication system an optical waveguide should not only transmit light without excessive attenuation, but also should not be subject to "cross-talk" from adjacent waveguides, nor cause dispersion of the transmitted light. In addition, an optical waveguide should allow only preselected modes of light to propagate along the fiber.

A very thorough and complete discussion concerning the operational theories of optical waveguides is contained in U.S. Pat. No. 3,157,726 issued to Hicks et al. and in a publication "Cylindrical Dielectric Waveguide Mode" by E. Snitzer, Journal of the Optical Society of America, vol. 51, No. 5, pages 491–498, May 1961. Another excellent source of information concerning optical waveguides is Fiber Optics—Principles and Applications by N. S. Kapany, Academic Press (1967). An abbreviated and simplified discussion of some of these theories follows so as to assist understanding of this invention.

Explanations of the physics of electrical and magnetic microwave transmission are often based on the concept that such waves are made up of a finite number of modes. Each of these modes has its own propagation and distribution characteristics. The propagation of light waves is governed by the same laws of physics that govern microwave propagation and therefore can also be studied in terms of modes.

Since each mode of light traveling along a glass fiber structure propagates at its own characteristic velocity, it can be shown that if the same information is initially supplied to all modes there will be a dispersion of this information after a given length of fiber due to the different propagation velocities. It then follows that if light propagation along the optical fiber could be restricted to preselected modes, more effective information transmission would result.

The conditions under which propagation of a particular mode will no longer be localized within and around the core of an optical fiber can be expressed in terms of a cutoff value U. An exceptionally complex equation, and an explanation thereof, from which the value of U for a particular mode can be determined may be found on page 55 of Fiber Optics—Principles and Applications by N. S. Kapany. On the same page of this book Kapany expresses a "fiber characteristic term"—"R" in terms of the optical fiber variables by the equation $$R = \frac{2\pi a}{\lambda}\sqrt{n_1^2 - n_2^2} \qquad (1)$$

where $a$=core radius of the waveguide
$\lambda$=wavelength of light to be transmitted
$n_1$=core index of refraction
$n_2$=cladding index of refraction which can be rewritten as $$R = \frac{2\pi a}{\lambda}\sqrt{(n_1+n_2)(n_1-n_2)} \qquad (2)$$

Then as is explained in Kapany, for a particular mode to propagate within an optical fiber having a particular "fiber characteristic term" R. R must be greater than or equal to the cutoff value U for said mode.

The mode $HE_{11}$, the definition and physical characteristics of which can be found in the aforementioned cited sources, is the only mode of light that will propagate along a fiber which has an R value of less than 2.405. Therefore, if R is set equal to 2.405, and Equation 2 is evaluated it can be seen that a method of limiting light propagation of a desired wavelength to one mode is to coordinate the parameters $a$, $n_1$, and $n_2$ of the waveguide. That is, if the difference between the two indices of refraction $(n_1-n_2)$ increases the core radius $a$ must decrease and if $(n_1-n_2)$ decreases the core radius $a$ must increase. Producing waveguides having core and cladding indices of refraction within limits necessary to maintain single mode propagation is difficult even for waveguides with very small cores. The difficulty is markedly increased in producing waveguides with larger cores. As an example, if the optical waveguide is to have a small core, that is a core diameter of approximately one micron, the required difference in the two indices of refraction will be on the order of $10^{-2}$; and if the optical waveguide is to have a large core, that is a core diameter of approximately one millimeter, the required difference in the two indices of refraction would be even smaller; that is, on the order of $10^{-4}$.

The intensity of light in an optical waveguide decreases as the radial distance from the waveguide center increases. Theoretically, of course, this intensity will never be zero regardless of the radial distance from the waveguide center the light travels. By proper selection of the core diameter, and the core and cladding indices of refraction, the decrease in intensity can be made to be so rapid, however, that the intensity can be presumed to be zero at a finite radial distance. There is no intensity distribution common to all waveguides, and intensity distribution will vary with the core diameter, the index of refraction of the core and cladding glass, and with the frequency of the light being transmitted; that is, within the same waveguide infrared light will have a different intensity distribution than will ultraviolet light.

If light intensity has not decreased to a very low level when it reaches the cladding-surrounding medium interface of the optical waveguide, three undesirable results may occur. First, light could strike said interface, be dispersed and then be reflected back into the waveguide core region. Second, some of the transmitted light could strike the interface and escape from the optical waveguide. Third, some of the escaped light could penetrate an adjacent optical waveguide thereby causing cross-talk.

(II) Description of the prior art

A present method of producing an optical fiber is to insert a rod of glass possessing the desired core characteristics into a tube of glass possessing the desired cladding characteristics. The temperature of this combination is then raised until the viscosity of the materials is low enough for drawing. The combination is then drawn until the tube collapses around and fuses to the inside rod. This resulting combination rod is then further drawn until its cross-sectional area is decreased to the desired dimension. During the drawing process, the rod and tube are normally fed at different speeds to produce a fiber with the desired core to cladding diameter ratio. This method is normally used to produce glass optical fibers having a large core and a thin outside cladding. As an example, the total diameter to core diameter ratio of such a fiber might be 8:7.

Attempts to produce optical waveguides with a very small core diameter and a very thick cladding, that is a total diameter to core diameter ratio on the order of 100:1, by this method have been unsatisfactory because of the extreme difficulty in maintaining the core and cladding dimensions. An additional problem is often caused by numerous tiny air bubbles and foreign particles being trapped at the core and cladding interface. These air bubbles and foreign particles are a source of light scattering centers. In addition, the core and cladding materials of any waveguide must be selected so that there is only a very small, yet precise, difference between the two indices of refraction. Glass tubes and glass rods which have small, yet precise, differences in their indices of refraction are not readily available. Variations in core diameter or in either index of refraction will affect the transmission characteristics of a waveguide.

SUMMARY OF THE INVENTION

It is an object of this invention to provide a method for economically producing an optical waveguide which overcomes the heretofore noted disadvantages.

Another object of the present invention is to provide a method for producing an optical waveguide that will not excessively attenuate transmitted light, and will propagate the light along a given fiber in preselected modes.

Still another object of the present invention is to provide a method for producing an optical waveguide that will not cause excessive dispersion shift in the transmitted light and will not be subject to cross-talk from adjacent fibers.

A further object of the present invention is to provide a better interface between the core and cladding of an optical waveguide.

Still a further object of the present invention is to provide a way of preventing the formation of light scattering centers at the core and cladding interface of an optical waveguide.

Another object of the present invention is to provide an optical waveguide which overcomes the hereinabove noted disadvantages.

Broadly, according to this invention an optical waveguide is produced by applying a film of material on the inside wall of a glass tube. This film of material may be a glass possessing the optical and physical qualities desired of the waveguide core; a doping material that will diffuse into the inside surface of the glass tube thus forming a film of glass on the inside tube wall having optical and physical qualities desired of the waveguide core; or a doped glass the dopants of which will partially diffuse into the inside surface of the glass tube resulting in a combination film of applied doped glass and doped glass formed by diffusion. This composite glass structure is then heated until the structure reaches a temperature at which the materials have a low enough viscosity for drawing. The composite structure is then drawn to reduce the diameter thereof until the film of core glass is collapsed, that is it seals the longitudinal hole to form a rod surrounded by cladding material; thereafter continued drawing of such a composite rod further reduces the diameter thereof to form a glass optical fiber which possesses the characteristics of an effective optical waveguide. That is, it transmits preselected modes of light without excessive attenuation, it is not subject to cross-talk by adjacent optical waveguides, and it does not cause excessive dispersion in the transmitted light.

These together with other objects, features and advantages of the present invention will become apparent to those skilled in the art from the following detailed description and the attached drawing.

BRIEF DESCRIPTION OF THE DRAWINGS

FIG. 1 shows a fragmented elevation view partially in cross-section of an optical waveguide being formed in accordance with the present invention.

FIG. 2 shows a cross-sectional view taken along line 2—2 of FIG. 1.

FIG. 3 shows a cross-sectional view taken along line 3—3 of FIG. 1.

FIG. 4 is an illustrative graph showing light intensity distribution as a function of the radial distance from the center of an optical waveguide.

DETAILED DESCRIPTION OF THE INVENTION

Referring to FIG. 1 there is shown a thick wall tube 10 of cladding glass, on the inside wall of which a thin film 12 of core glass has been formed. This thick wall tube of cladding glass and the thin film of core glass is heated by the surrounding furnace 14 until tube 10 and core glass 12 reach a temperature at which the materials have low enough viscosity for drawing. This composite structure is then drawn until the longitudinal hole 16 collapses, that is the core glass fills the hole 16 to form solid core 22 surrounded by cladding 20, and the cross-sectional area is reduced until fiber 24 is produced which has a thick cladding surrounding a small diameter solid core. The total diameter to core diameter ratio is preferably in the range of 10:1 to 300:1, although ratios outside of this range would not be inoperable.

A thick wall tube from which suitable cladding could be produced may be prepared by core drilling solid rods of glass having the index of refraction desired of the cladding glass. The rough surfaces left by drilling may be made smooth by such methods as: starting with a larger blank and redrawing the blank after core drilling, by laser milling the inside surface, by mechanically polishing the inside surface, by fire polishing the inside surface or by washing the tube in hydrofluoric acid. A particularly suitable method of smoothing the inside wall of the tube is by first mechanically polishing the rough surface left by core drilling and thereafter flame polishing the mechanically polished surface. Since minimum attenuation of the transmitted signal is a desired feature of any communication system, an optical waveguide should be produced from a glass having minimum light absorption characteristics, and although any optical quality glass may be used, a particularly suitable glass from which to make the cladding is fused silica.

The core of an optical waveguide may also be produced from any optical quality glass having a suitable index of refraction. However, since the core glass should have a higher index of refraction than the cladding, and also have physical characteristics similar to the cladding; the same type of glass used for the cladding doped with a small amount of some other material to slightly increase the index of refraction is an excellent choice for the core glass. Therefore, if pure fused silica is used as the cladding glass, fused silica doped with a material to increase the index of refraction can be used as the core glass. There are many possible materials that can satisfactorily be used as doping material alone or in combination with each other. These include, but are not limited to, titanium oxide, tantalum oxide, tin oxide, niobium oxide, zirconium oxide, and aluminum oxide. A particularly suitable core glass is fused silica doped with titanium oxide. There are two reasons, however, for not adding too much doping material to the core glass. First, since additional doping material will cause the index of refraction to increase, the difference between the index of refraction of the pure fused silica cladding glass and the core glass will also increase forcing a decrease in the allowable core diameter of the waveguide. Second, if too large a percentage of doping material is added the fused silica will lose its excellent light transmission qualities. The percentage of doping material that should be added to fused silica to produce a small, yet precise, change in the index of refraction can readily be determined by one skilled in the art.

To produce the waveguide core, a film of glass with the desired physical and optical qualities, such as viscosity, coefficient of expansion and index of refraction, is formed on the inside wall of a tube of the desired cladding material. The film of glass may be formed by applying a layer of glass with the desired qualities, applying a layer of doping material that will diffuse into the inside surface of the glass tube thus forming a film of glass with the desired qualities; or applying a layer of doped glass, the doping material of which will partially diffuse into the inside surface of the glass tube, resulting in a film of applied glass and a film of glass formed by diffusion the combination of said films having the desired qualities. The desired film may be applied in a variety of methods including but not limited to radio frequency sputtering, sintering a film of soot deposited by a flame hydrolysis process, chemical vapor deposition, depositing a glass frit layer, and by bathing the inside wall of the tube in a fluid that will make an "ion-exchange" with the glass. A particularly effective method is to sinter a soot layer of the desired material, deposited on the inside wall of the tube, by a flame hydrolysis process similar to that described in U.S. Pat. 2,272,342 issued to J. F. Hyde, and U.S. Pat. 2,326,059 issued to M. E. Nordberg. A modification of the Nordberg process that will deposit titanium doped fused silica on the inside wall of a glass tube follows. Dry oxgen is bubbled through a tank containing a liquid mixture of approximately 53% by weight silicon-tetrachloride, $SiCl_4$, and 47% by weight titanium-tetrachloride, $TiCl_4$. These liquids are at approximately 35° C. $SiCl_4$ and $TiCl_4$ vapors picked up by the oxygen are then passed through the center of a gas-oxygen flame where they are hydrolyzed to form a "soot"; that is, minute glass particles, with a composition of approximately 95% by weight $SiO_2$ and 5% by weight $TiO_2$. The glass soot leaves the flame in a steady stream and is deposited on the inside wall of a glass tube by directing the stream of soot at an open end of the tube. The thickness of the soot layer is controlled by the flow rates, distance between the glass tube and the flame, inside diameter of the glass tube, and the time allowed for deposition. Uniformity of the soot layer is greatly enhanced if a slight vacuum is applied to the end of the tube opposite the flame. The tube and the soot are then heated until the soot sinters; thereby resulting in a thin film of titanium doped fused silica glass being bonded to the inside wall of the tube. Sintering a soot layer of approximately 30 microns results in a glass film of approximately 2 microns.

The necessary ability of an optical waveguide to transmit a useable quantity of light is dependent upon the light energy not being dispersed by "light scattering centers," as well as not being excessively absorbed by the glass material. These centers are often caused by tiny air bubbles or impurities in the waveguide at the core-cladding bond. The method of this invention provides an unusually clean and strong bond, thus eliminating most of these "light scattering centers."

The intensity of light in an effective optical waveguide decreases rapidly as the radial distance from the core center increases. Therefore, if this intensity approaches zero at a distance from the core center that is less than the radius of the waveguide, then the waveguide will not be noticeably affected by cross-talk and phase shift problems. In FIG. 4, the radial distance $r_1$ represents the radius of the waveguide core, and $r_2$ represents the outside diameter of the waveguide. The light intensity is shown as being substantially wholly within the core, and decreases to almost zero at the outside diameter of the waveguide as is necessary for an effective optical waveguide.

To limit light propagation along an optical waveguide to preselected modes, the core diameter, the core index of refraction, and the cladding index of refraction must be coordinated according to Equation 2. An example describing a technique that might be used in determining the coordinated values of the core diameter $a$, the core index of refraction "$n_1$" and the cladding index of refraction "$n_2$" follows. If fused silica is chosen to be the cladding glass, the index of refraction of the cladding would be approximately 1.4584. The number 1.4584 is normally assumed by those skilled in the art to be the index of refraction of fused silica, for sodium light $\lambda = 5893$ A., and is the same value given in the CRC Handbook of Chemistry and Physics, page E-224, 49th edition, 1968. Further, if the weight percentage of $SiO_2$ and $TiO_2$ are selected so that the core glass has a resulting index of refraction of 1.466, the core diameter necessary to limit light propagation to the mode $HE_{11}$ within the optical waveguide is determined by solving the equation $$R = \frac{2\pi a}{\lambda}\sqrt{(n_1+n_2)(n_1-n_2)}$$

where:

$R = 2.405$, and thereby sets the cutoff value such that substantially only light mode $HE_{11}$ will propagate down the fiber
$a =$ radius of the core
$\lambda =$ wavelength of the transmitted light (sodium light) $= 5893$ A.
$n_1 =$ core index of refraction $= 1.466$
$n_2 =$ cladding index of refraction $= 1.4584$ If the above equation is solved using the parameters as listed it can be shown that the core radius $a$ should be less than or equal to 1.5 microns if the right hand side of the equation is to be less than or equal to 2.405 thereby limiting light propagation to the $HE_{11}$ mode.

It has been found that light absorption properties may be decreased and light transmission qualities improved in titanium oxide doped fused silica formed into optical waveguides, if the waveguides are drawn in an oxygen atmosphere and then "heat treated" in an oxygen atmosphere. The "heat treatment" referred to consists of heating the waveguide in an oxygen atmosphere to between 500° C. and 1000° C. for not less than 30 minutes; the length of treatment being related to the treatment temperature. Lower temperatures require longer treatment periods, while treatment at the higher temperature allows shorter time periods.

A specific example of a waveguide produced by the practice of this invention follows. A ¼ inch diameter hole was drilled down the longitudinal axis of a ¾ inch diameter rod of fused silica that was approximately 5 inches in length, thus forming a tube. The rough surface left by drilling was then mechanically polished. The mechanically polished surface was then flame polished to produce a very smooth surface on the inside wall of the tube. A soot of fused silica doped with titanium oxide was then applied to the inside tube wall by the heretofore described modified flame hydrolysis process. This glass soot was approximately 20 microns thick, and was approximately 94.75% fused silica and 5.25% titanium oxide. This composite structure was then heated until the deposited glass soot sintered; thereby resulting in a thin film of titanium oxide doped fused silica bonded to the inside wall of the tube. Sintering occurred at approximately 1450° C. The composite structure was then further heated in substantially an oxygen atmosphere until it reached a temperature at which the materials had low enough viscosity for drawing (approximately 1900° C.). The composite structure was then drawn to reduce the diameter thereof until the film of titanium oxide doped fused silica was collapsed, that is, it sealed the longitudinal hole to form a solid core surrounded by pure fused silica. The resulting composite rod was then further drawn to reduce the diameter thereof to a final diameter of approximately 100 microns. The core of the optical waveguide was measured at approximately 3 microns in diameter. The core index of refraction was approximately 1.466 while the cladding material had an index of refraction of approximately 1.4584. After the fiber was drawn, it was heat treated at 800° C. in an oxygen atmosphere for approximately three hours. An optical fiber produced by the method as outlined in this example possesses the characteristics desired in an optical waveguide using sodium light, that is propagation of one light mode, namely $HE_{11}$ mode, without excessive attenuation, and very little susceptibility to dispersion and cross-talk.

Although the present invention has been described with respect to specific methods of production, it is not intended that such specific references be limitations upon the scope of the invention except insofar as set forth in the following claims.

We claim:

1. A method of producing an optical fiber comprising the steps of
   providing a glass tube,
   forming a film of core glass, having an index of refraction different than that of said glass tube, on the inside wall of said glass tube,
   heating the composite structure so formed to the drawing temperature of the materials thereof, and
   drawing the heated composite structure to reduce the cross-sectional area thereof and collapse said film of core glass to form a fiber having a solid cross-sectional area.

2. The method of claim 1 wherein the film of core glass is formed by steps comprising
   depositing a film of soot of said core glass on the inside walls of said glass tube by flame hydrolysis, and
   heating said tube and core glass soot until said soot sinters prior to the drawing step.

3. The method of claim 2 wherein sintering the core glass soot and drawing the composite structure is accomplished by the same heating operation.

4. The method of claim 1 wherein the film of core glass is formed by radio frequency sputtering.

5. The method of claim 1 wherein the film of core glass is formed by chemical vapor deposition.

6. The method of claim 1 wherein the film of core glass is formed by applying glass frit to the inside walls of said tube.

7. The method of claim 1 wherein the film of core glass is formed by steps comprising:
   applying a layer of material selected from the group consisting of doping material and glass in combination with doping material to the inside walls of the glass tube, and
   diffusing at least a portion of said material into the surface portion of the inside wall of said glass tube thereby changing the composition of said surface portion.

8. The method of claim 7 wherein the layer of material is applied by flame hydrolysis.

9. The method of claim 7 wherein the layer of material is applied by chemical vapor deposition.

10. The method of claim 7 wherein the layer of material is applied by radio frequency sputtering.

11. The method of claim 7 wherein the layer of material is doped glass frit applied to the inside walls of said tube.

12. The method of claim 7 wherein diffusion of the material and drawing the composite structure is accomplished by the same heating operation.

13. The method of claim 7 wherein the doping material is at least one of the materials selected from the group consisting of titanium oxide, tantalum oxide, tin oxide, niobium oxide, zirconium oxide, and aluminum oxide.

14. The method of claim 1 wherein the cladding tube is fused silica and the core glass is fused silica doped with at least one material selected from the group consisting of titanium oxide, tantalum oxide, tin oxide, niobium oxide, zirconium oxide and aluminum oxide.

15. The method of claim 1 wherein the said cladding and applied core glass are drawn in substantially an oxygen atmosphere.

16. The method of claim 1 wherein the said fiber with a solid cross-sectional area is heat treated in an oxygen atmosphere.

17. The method of claim 1 wherein the index of refraction of the said tube is less than the index of refraction of the applied core glass.

18. The method of claim 1 wherein the step of providing a glass tube comprises:
   drilling a solid rod of glass to form said tube,
   mechanically polishing the drilled surface of said tube, and
   flame polishing the mechanically polished surface.

19. The method of claim 18 wherein the film of core glass is formed by steps comprising:
   depositing a thin film of core glass soot on the inside wall of said tube by flame hydrolysis, and
   sintering said soot to form a core glass having an index of refraction different than that of said glass tube.

20. The method of claim 18 wherein the total diameter to core diameter ratio is within the range of 10:1 to 300:1.

21. The method of claim 18 wherein the composite structure is drawn in an oxygen atmosphere.

22. The method of claim 18 wherein the said fiber with a solid cross-sectional area is heat treated in an oxygen atmosphere.

23. The method of claim 18 wherein the glass rod is fused silica, and the deposited core glass is fused silica doped with not more than 15% titanium oxide.

24. The method of claim 18 wherein the index of refraction of the solid glass rod is less than the index of refraction of the applied core glass.

25. The method of claim 18 wherein sintering the core glass soot and drawing the composite structure is accomplished by the same heating operation.

26. An optical waveguide produced by the method of claim 1.

27. The method of making an optical fiber comprising the steps of:
providing a glass tube,
depositing a thin film of doped fused silica soot on the inside wall of said tube by flame hydrolysis,
heating the composite structure,
sintering said soot to form a core material having an index of refraction higher than that of said tube,
drawing said structure to reduce the cross-sectional area thereof and collapse said film of core material forming a fiber having a solid cross-section with the total diameter to core diameter ratio being within the range of 10:1 to 300:1, and
heat treating said fiber in an oxygen atmosphere.

28. The method of claim 27 wherein the step of providing a glass tube comprises:
drilling a solid fused silica rod to form said tube,
mechanically polishing the drilled surface of said tube, and
flame polishing the mechanically polished surface.

References Cited

UNITED STATES PATENTS

| | | | |
|---|---|---|---|
| 2,237,754 | 4/1941 | Davies | 65—60 |
| 3,275,428 | 9/1966 | Siegmund | 65—DIG. 7 |
| 3,294,504 | 12/1966 | Hicks, Jr. | 65—DIG. 7 |
| 3,331,670 | 7/1967 | Cole | 65—4 |
| 3,479,168 | 11/1969 | Bird et al. | 65—3 |
| 3,481,390 | 12/1969 | Veltrie et al. | 65—3 X |
| 2,433,116 | 12/1947 | Greenbowe et al. | 65—60 |
| 1,793,529 | 2/1931 | Taylor | 65—DIG. 7 |
| 3,146,082 | 8/1964 | Hicks, Jr. et al. | 65—3 |
| 3,241,934 | 3/1966 | Granitsas et al. | 65—3 |
| 3,504,730 | 4/1970 | Dannohl | 65—3 UX |
| 3,455,666 | 7/1969 | Bazinet, Jr. | 65—4 |
| 3,481,390 | 12/1969 | Veltri et al. | 65—121 X |
| 3,614,197 | 10/1971 | Nishizawa | 65—41 X |
| 3,607,322 | 9/1971 | Brady | 65—41 X |

FRANK W. MIGA, Primary Examiner

U.S. Cl. X.R.

65—4, DIG. 7, 30, 121; 106—50, 54; 350—96 B